G. TAUSSIG.
MACHINE FOR COLORING MOTION PICTURE FILMS.
APPLICATION FILED SEPT. 4, 1919.

1,396,791.

Patented Nov. 15, 1921.
11 SHEETS—SHEET 1.

Inventor
Gottlieb Taussig.

By
Jas. H. Griffin
his Attorney

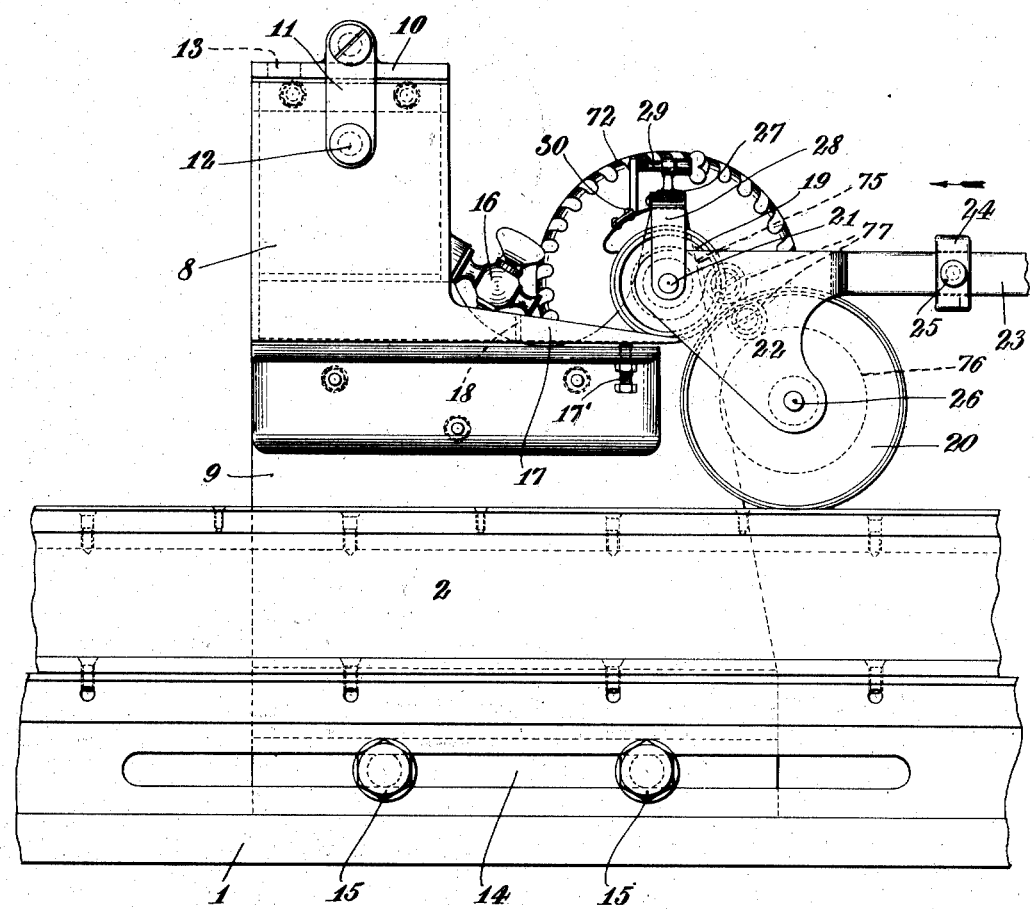

G. TAUSSIG.
MACHINE FOR COLORING MOTION PICTURE FILMS.
APPLICATION FILED SEPT. 4, 1919.

1,396,791.

Patented Nov. 15, 1921.
11 SHEETS—SHEET 3.

INVENTOR
Gottlieb Taussig.
BY Jas. H. Griffin
his ATTORNEY

G. TAUSSIG.
MACHINE FOR COLORING MOTION PICTURE FILMS.
APPLICATION FILED SEPT. 4, 1919.

1,396,791. Patented Nov. 15, 1921.
11 SHEETS—SHEET 5.

INVENTOR
Gottlieb Taussig.
BY
Jas. H. Griffin
his ATTORNEY

G. TAUSSIG.
MACHINE FOR COLORING MOTION PICTURE FILMS.
APPLICATION FILED SEPT. 4, 1919.

1,396,791.

Patented Nov. 15, 1921.

INVENTOR
Gottlieb Taussig.

BY
Jas. H. Griffin
his ATTORNEY

G. TAUSSIG.
MACHINE FOR COLORING MOTION PICTURE FILMS.
APPLICATION FILED SEPT. 4, 1919.

1,396,791.

Patented Nov. 15, 1921.
11 SHEETS—SHEET 11.

INVENTOR
Gottlieb Taussig.
BY
Jas. H. Griffin
his ATTORNEY

UNITED STATES PATENT OFFICE.

GOTTLIEB TAUSSIG, OF NEW YORK, N. Y.

MACHINE FOR COLORING MOTION-PICTURE FILMS.

1,396,791.  Specification of Letters Patent.  Patented Nov. 15, 1921.

Application filed September 4, 1919. Serial No. 321,700.

*To all whom it may concern:*

Be it known that I, GOTTLIEB TAUSSIG, a citizen of the United States, residing in the city of New York, borough of Bronx, county of Bronx, and State of New York, have invented a certain new and useful Machine for Coloring Motion-Picture Films, of which the following is a specification.

This invention is a machine for coloring motion picture films, and, speaking generally, the object of the invention is to color the films by applying thereto a single or a plurality of colors with a view to having the various parts of the picture stand out more definitely and positively, and appear, relatively speaking, in their natural aspects. Numerous attempts have heretofore been made to color films of the character under consideration, but, so far as applicant is aware, no successful or commercial process has ever been operated in this country. The machine of the present invention, however, accomplishes the object specified in a simple, efficient and economical manner, and results in a film having the desired appearance of reality and naturalness.

Features of the invention, other than those specified, will be apparent from the hereinafter detailed description taken in conjunction with the accompanying drawings.

The drawings illustrate one practical embodiment of the invention, but the construction therein shown is to be understood as illustrative only of the principle of the invention and what I now regard as the best practical embodiment thereof, but not as defining the limits of the invention.

Figure 1 is a front view, in elevation, of the complete machine;

Fig. 1ª is a fragmentary view, in elevation, showing the color applying apparatus;

Figure 1:
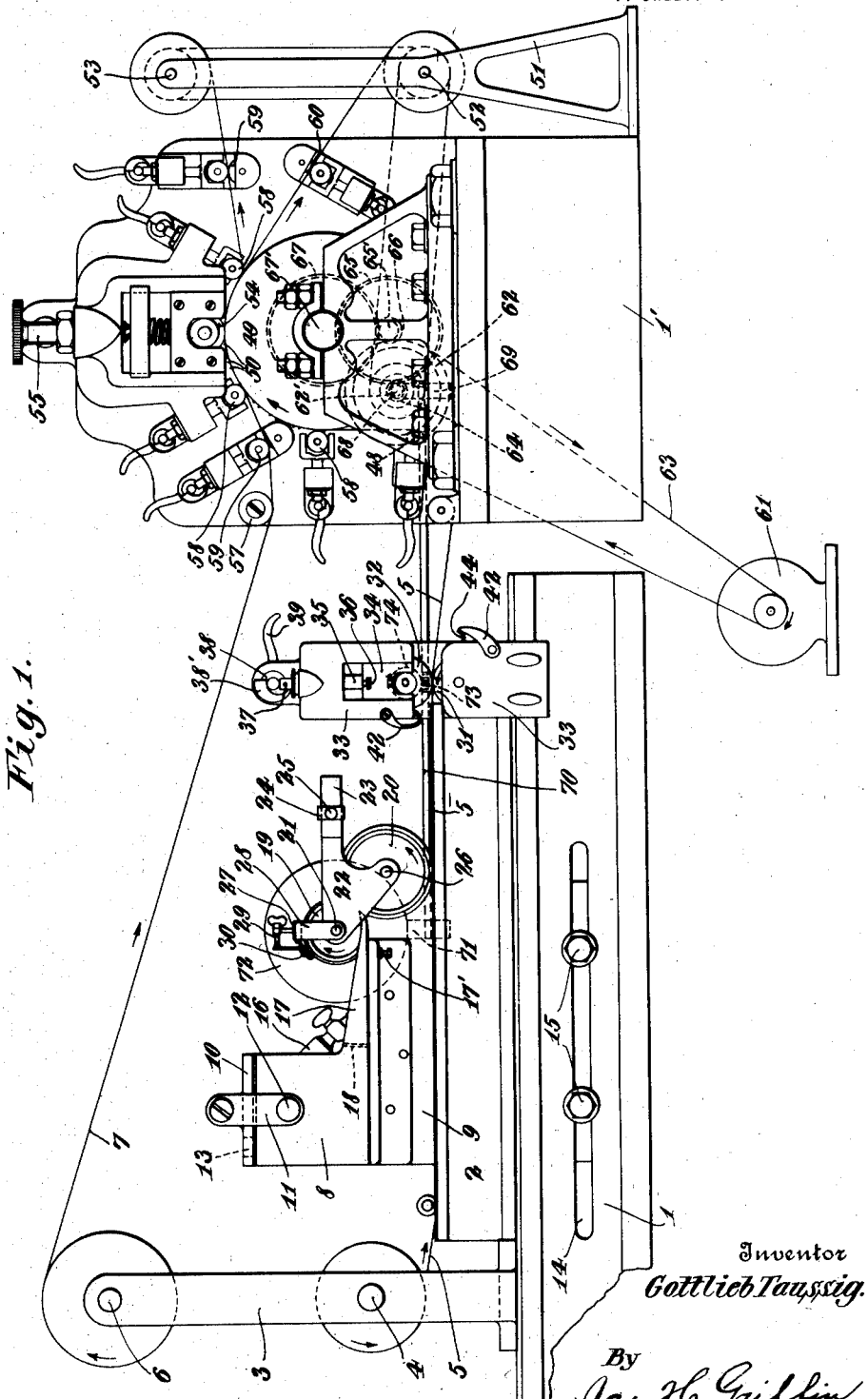
Figure 2:
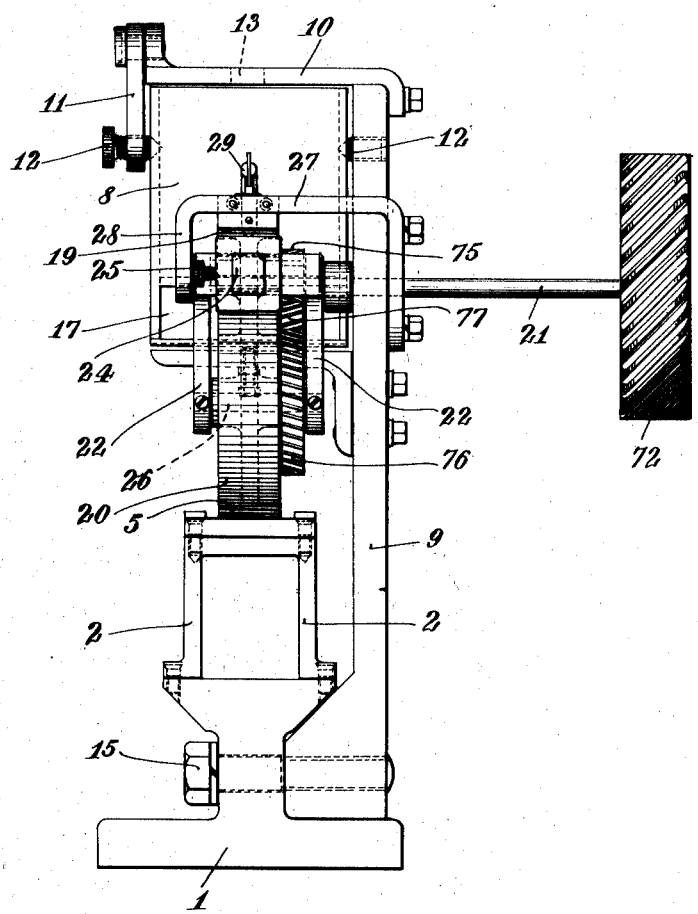
Fig. 2 is a side elevation of the apparatus shown in Fig. 1ª, looking in the direction of the arrow appearing thereon.
Figure 3:
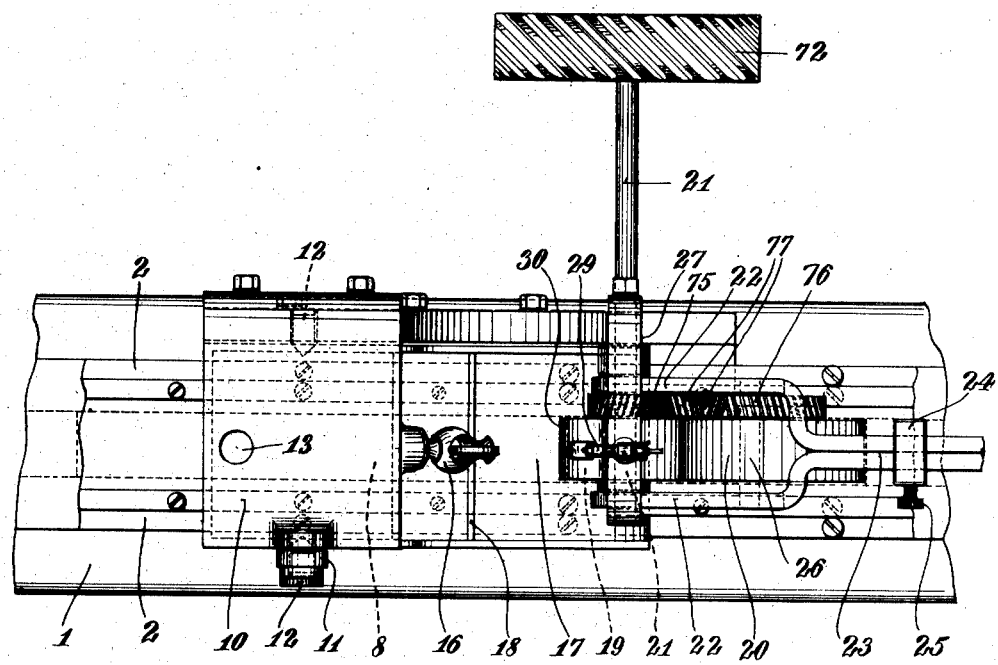
Fig. 3 is a top plan view of the apparatus shown in Figs. 1ª and 2.

Referring to the drawings, 1 designates the base or support of the machine on which is mounted the table or bed 2 and standards 3. Housed in standards 3 is a roll, the shaft of which is designated 4, on which is wound a prepared picture film 5, hereinafter described more in detail, which film is employed to effect the printing or coloring operation. Also housed in standards 3 is a second roll, the shaft of which is designated 6, and on which roll is wound the film 7, a plain positive, to which color is to be applied. Slidably mounted on table 2 is a color containing and applying apparatus embodying, specifically, a color supply tank 8, shown as suspended from an upright or standard 9 through the medium of a cross-piece 10, which also serves as a cover for the tank 8, depending hanger 11 and supporting screws 12, whereby the color tank may be readily removed and replaced. Cross-piece 10 is provided with an opening 13 through which, if desired, color may be supplied to the tank. The color apparatus is rendered adjustable on the bed, lengthwise thereof, by means of a slot 14, formed in the base of the machine, through which extend the bolts 15 which may be tightened to secure the color apparatus in its adjusted position. Color tank 8 is provided with a faucet 16 which supplies the color to a trough 17, the rear wall of which is designated 18. Coöperating with trough 17 is a color take-up roll 19 which supplies the color to a second roll 20, which latter roll applies the color to the film 5.

The main driving shaft of the color apparatus is shown at 21 and loosely mounted thereon are the terminals 22 of a forked yoke 23 near the outer end of which is mounted an adjustable weight 24, which may be secured in the desired position by means of an adjusting screw 25. Mounted in the depending sides of the yoke is a shaft 26 which carries the color applying roll 20, which applies color to film 5 as heretofore described. Shaft 21 carries color take-up roll 19. The position of weight 25 determines the pressure at which the color applying roll 20 engages film 5.

Secured to the upper part of standard 9 is a hanger 27, one of the arms 28 of which serves as a support for an adjusting screw 29, on the outer end of which is secured a scraper 30, the lower end of which is adapted to remove surplus color from the color take-up roll 19.

As the film 5 leaves the color applying roll 20, its entire exposed face is coated with color. Apparatus is employed however to remove the color from such portions of the film as it is desired not to act as a printing surface, and to leave the color on such parts of the film only as it is desired to serve as a printing surface. To produce this result, certain parts of the printing film 5, those parts from which it is desired not to print, are treated, prior to mounting the film in the machine, with any well known color resisting medium or agent. One way of accomplishing this result is to coat such parts of the film, as are desired to make color resisting, with pyroxylin, i. e., any suitable solution of guncotton or celluloid. The thin coating thus produced on the film, at the parts specified, has little or no attraction or affinity for color, and should a small quantity of the color remain on the parts of the film thus treated, it is completely wiped off when the film is subsequently passed between wiping roller 32 and its coöperating roller 31, the color remaining only on the remaining portions of the film. The color will not adhere to, i. e., may be readily removed from, those portions of the film which have been thus treated with the resist. To effect this removal of color, the printing film 5 is passed over a supporting roll 31 and its color treated surface engages a coöperating wiping roll 32 which wipes off or removes the color from those portions of the film, i. e., the non-printing surface, as have been treated as described with the color resisting agent.

Figure 4:
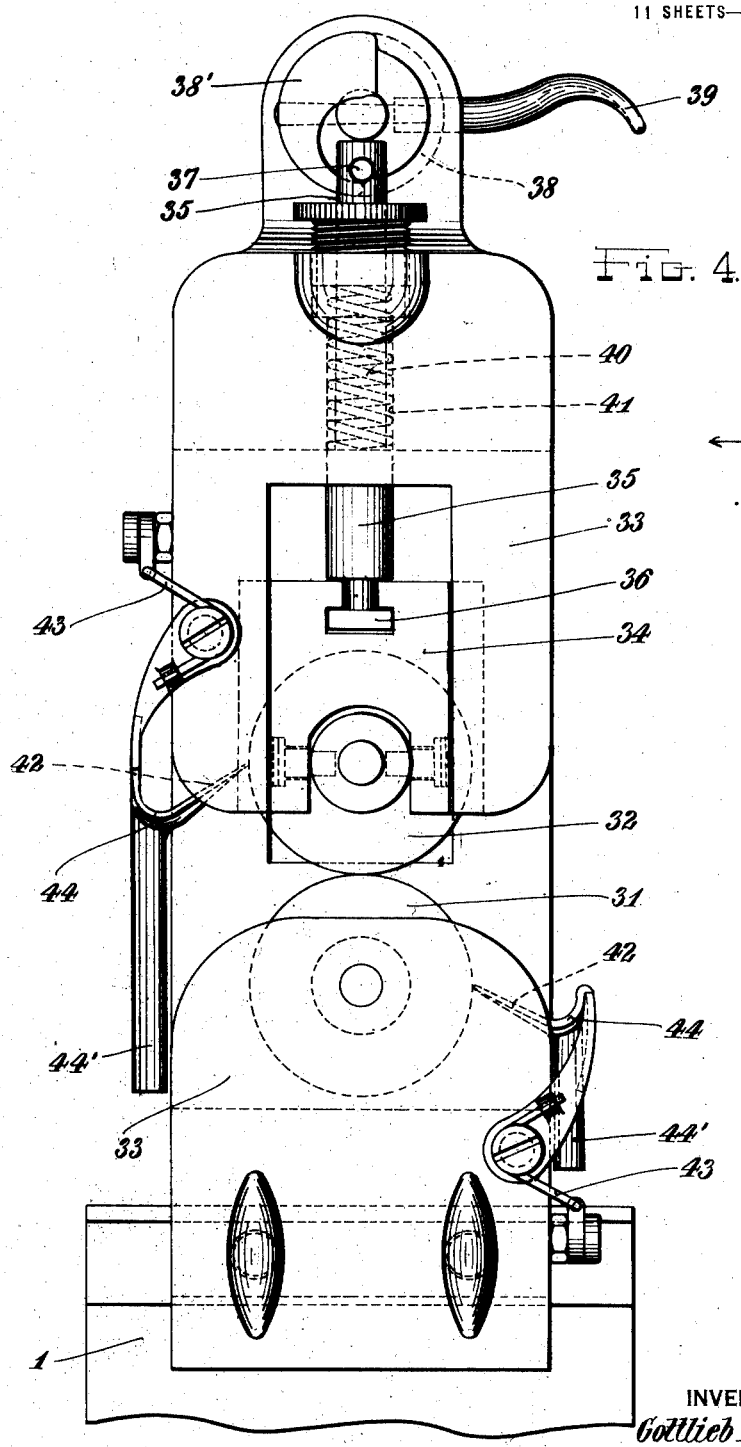
Fig. 4 is a fragmentary view, in front elevation, showing the apparatus for removing the surplus color material from the film and feeding it to the printing apparatus, hereinafter described more in detail.
Figure 5:
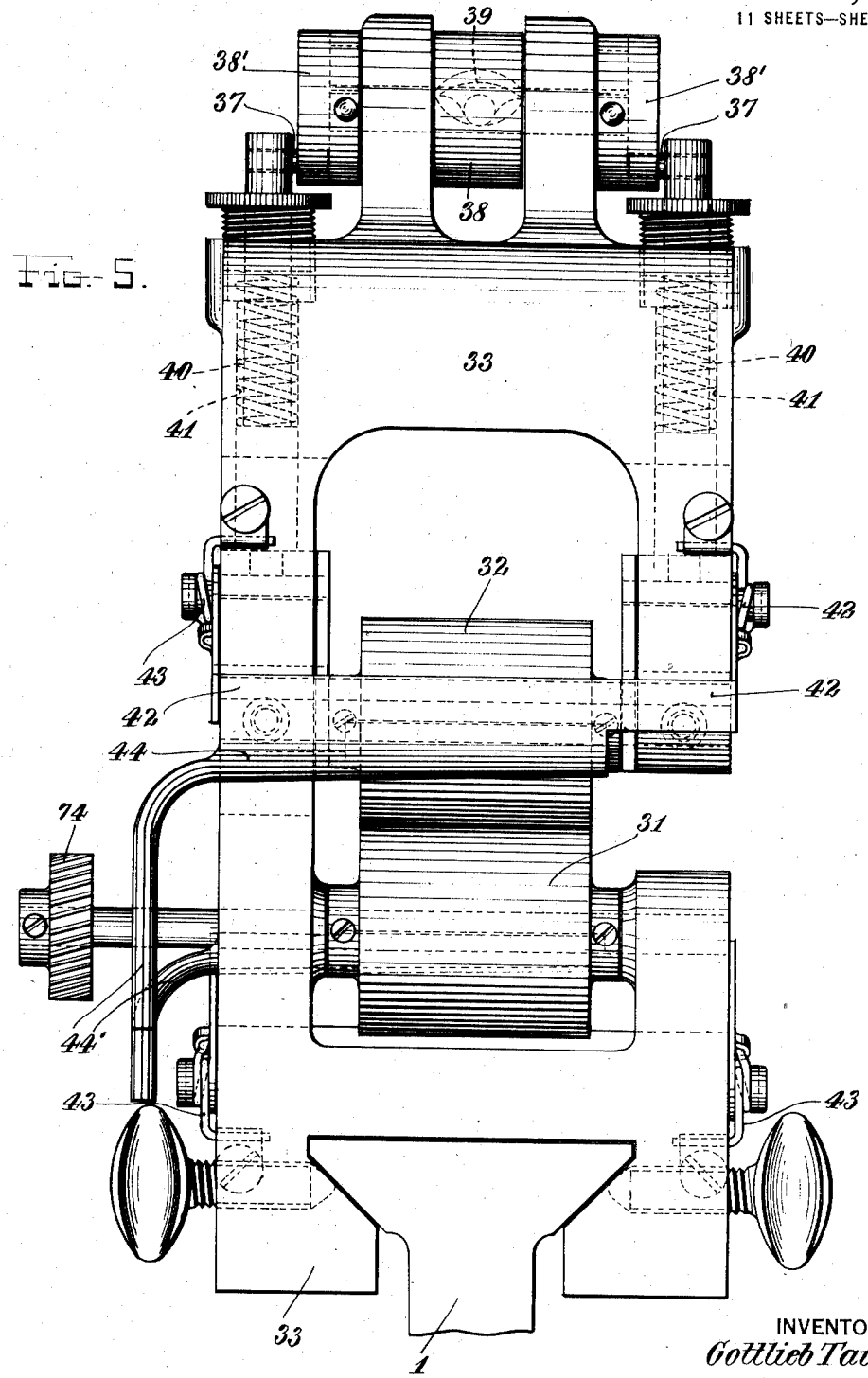
Fig. 5 is a front view of the apparatus shown in Fig. 4, looking in the direction of the arrow appearing thereon.
Figure 6:
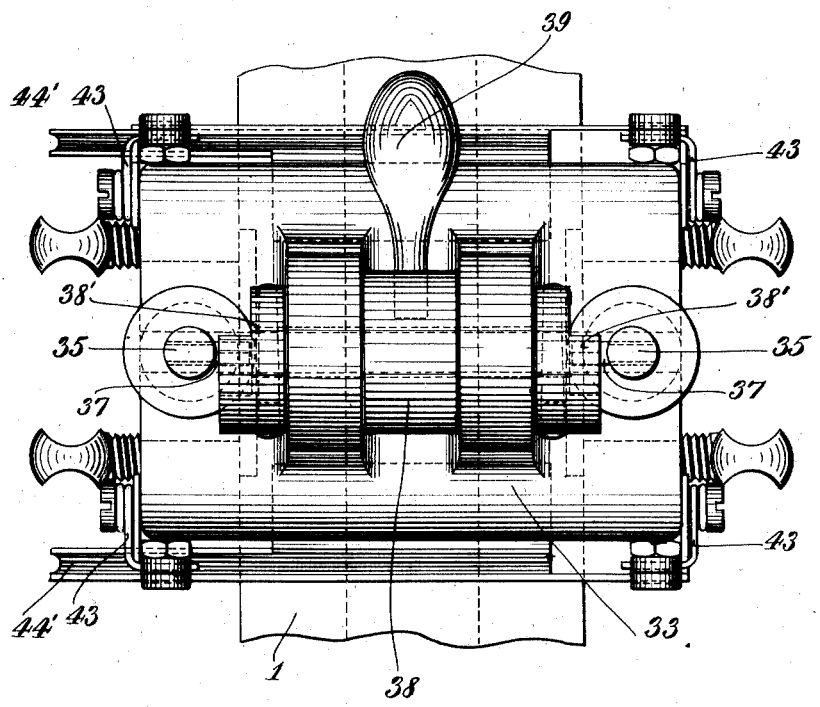
Fig. 6 is a top plan view of the apparatus shown in Figs. 4 and 5.
Figure 7:
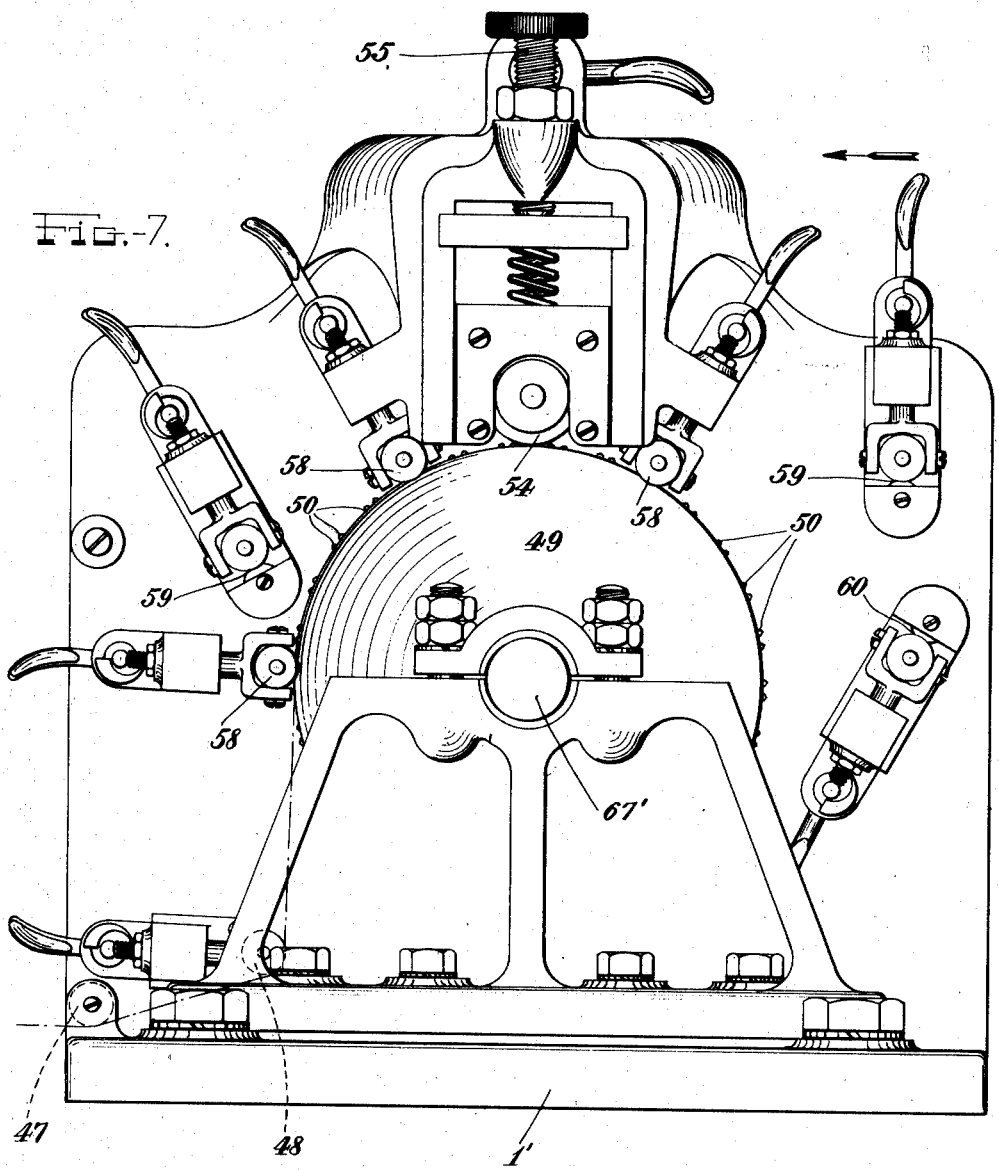
Fig. 7 is a view of the printing mechanism.
Figure 8:
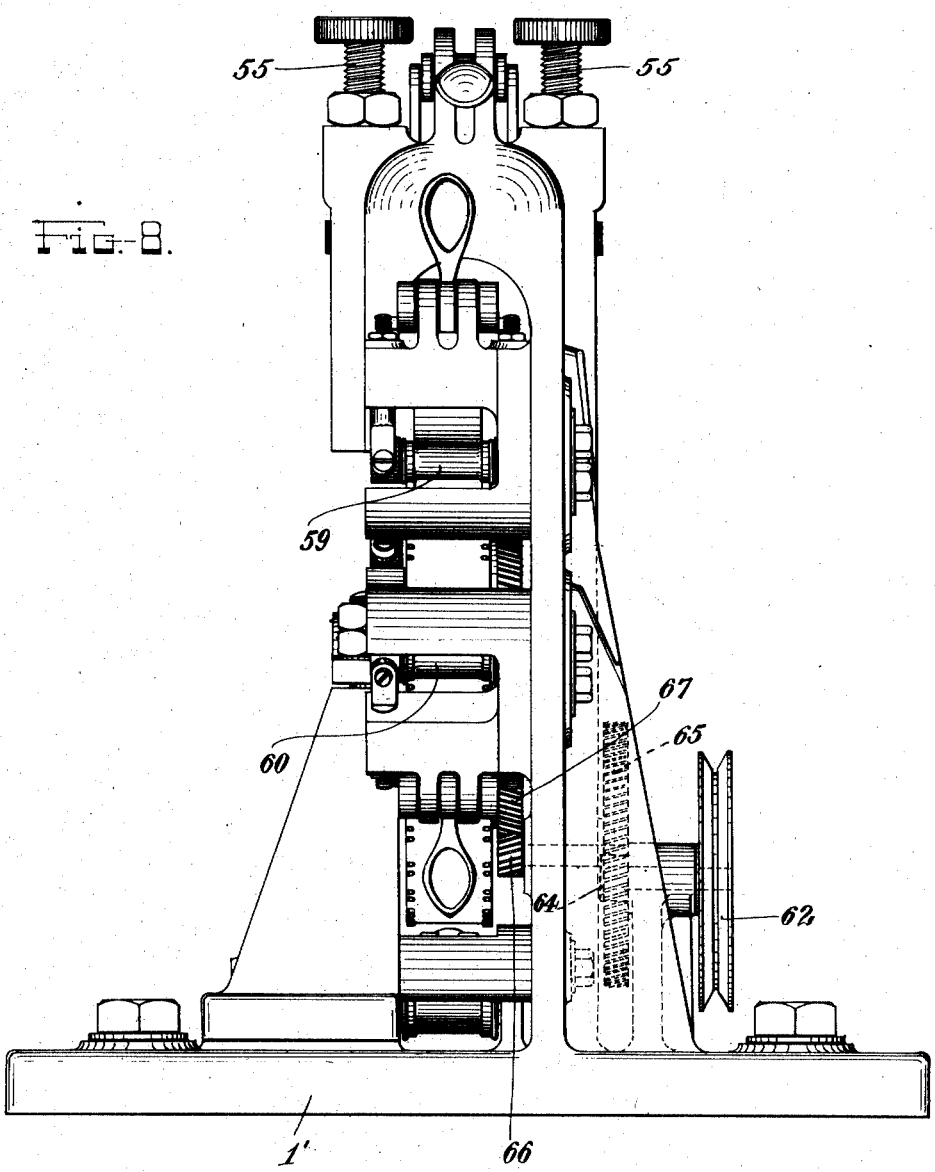
Fig. 8 is a front view or elevation of the printing mechanism shown in Fig. 7, looking in the direction of the arrow appearing on said figure.
Figure 9:
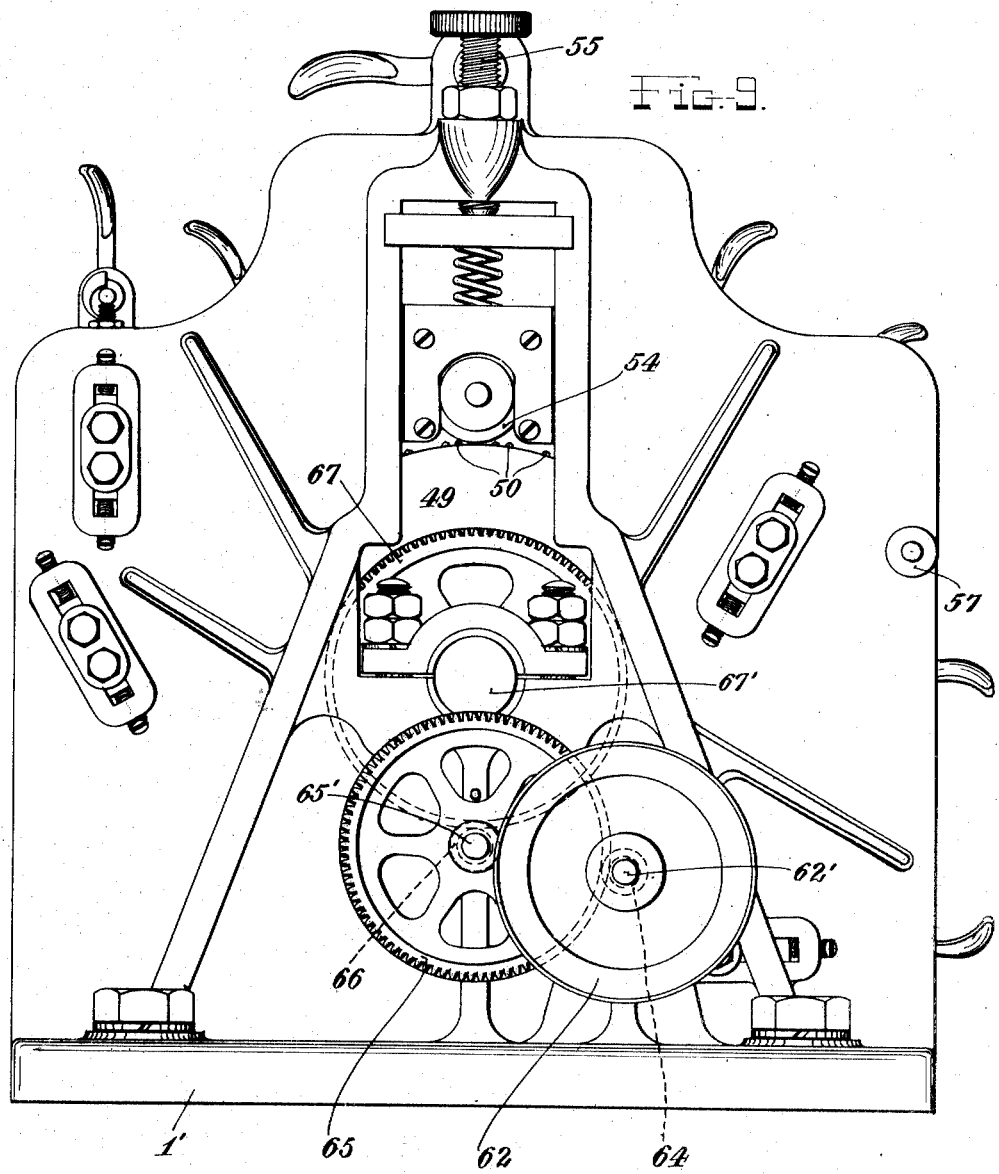
Fig. 9 is a rear elevation of the printing apparatus.
Figure 10:
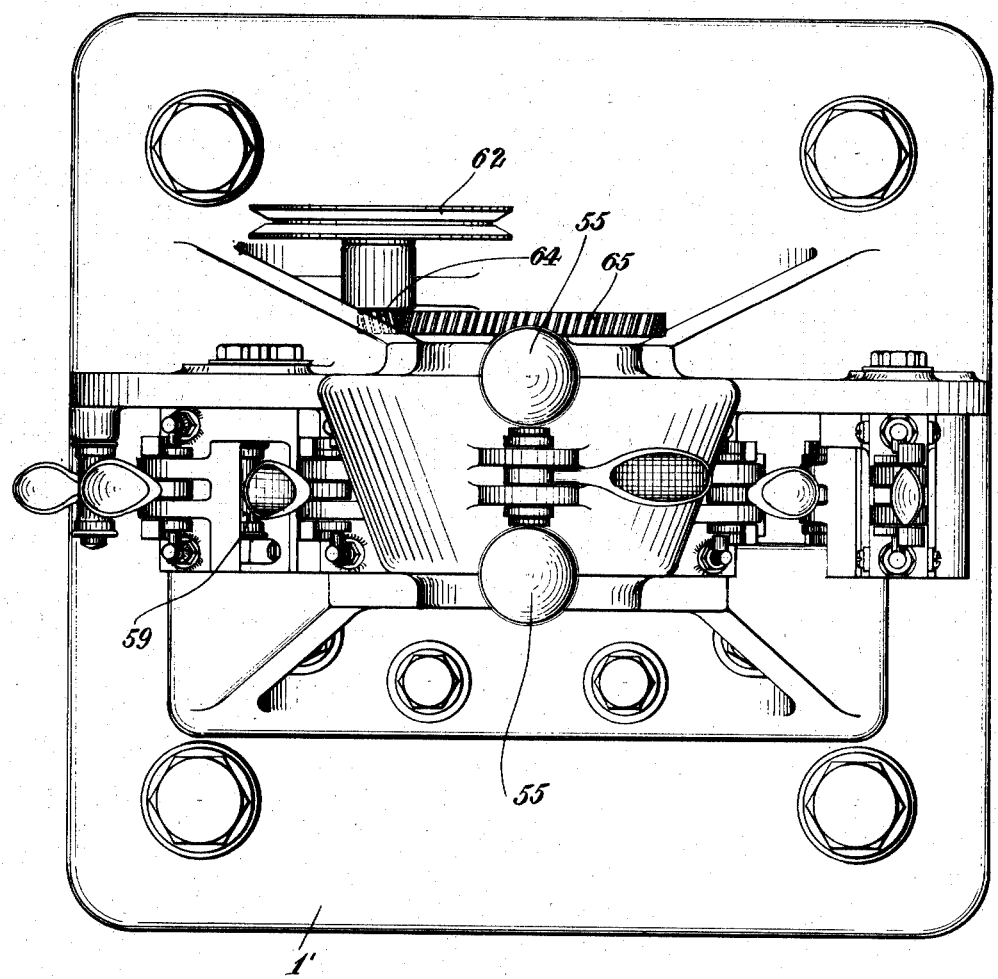
Fig. 10 is a top plan view of the printing mechanism.

Rolls 31 and 32 are mounted in suitable housings 33, roll 32 being journaled in slidable bearings 34, which may be adjusted vertically to vary the pressure of roll 33 on film 5, (see Fig. 4). As shown, these blocks may be raised or lowered by means of rods 35, the lower ends of which are T-shaped as appears at 36, and the upper ends of which are provided with pins 37 which take into a roller 38, which latter may be manipulated by means of cam 38' operable by lever 39. The upper portions of the pins are surrounded by coiled springs 40, positioned in chambers 41 of the housings 33, whereby roll 32 is given a yielding action. Associated with rolls 31 and 32 are scrapers 42, held in yielding engagement therewith by means of springs 43. Connected with each scraper is a trough 44 into which the scraped off color drains, each of said troughs having a drain pipe 44'.

The film 5 having been prepared for printing as described passes beneath guide rollers 47, 48, thence over roller 49 which forms the printing bed or form of the machine. The lateral edges of roll 49 are provided with pilots or projections 50, which take into the perforations customarily provided on the edges of the films, and serve to accurately guide their travel and secure the desired registration of the films for the printing or coloring operation. Film 5, after passing over form roller 49, is wound on a take-up roll mounted in the lower part of standard 51, the shaft of said roll being indicated at 52. The printing mechanism is supported on base 1'.

Film 7, which is to be colored, engages film 5, with the parts in due registration for the coloring operation, on form roller 49, and having had color applied thereto, at the predetermined locations, is wound onto a roll housed in the upper part of standard 51, the shaft of said roller being indicated at 53. Proper engagement of films 5 and 7, whereby color is transferred from the coloring film 5 to the film to be colored 7, is effected by means of a spring pressed roller 54, the pressure on which is adjustable by means of screws 55, similar to that described in connection with pressure roll 32.

It will be understood that suitable guide rollers are provided to properly direct the paths of the films, such as 47 and 48 described, and those shown at 56 and 57, (see Fig. 1). The guiding and tension rolls 58 engaging the films on form roll 49 are made adjustable as shown, and as heretofore described in connection with pressure rolls 32 and 54, as are likewise the sets of rolls 59 and 60, which guide the films intermediate the form roll 49 and the take-up rolls. The speed of travel of the printing film 5 is controlled by pulley 62, and may be adjusted so as to be brought into correct registration with film 7 by means of the tension rollers referred to above, 48 and 59. It will be noted that tension roll 48 is employed to adjust the film 5, whereas tension roll 59 performs the same function in connection with film 7. By the coöperating mechanism described, film 7 is caused to travel at the same speed as film 5.

One particular color having been applied to certain parts of the printing film 5, and transferred to the corresponding parts of film 7, certain other parts of another film corresponding to film 5 may have a different color similarly applied thereto, whereupon the transfer to the film to be printed may be effected as in the first instance, and the operation repeated as often as is necessary to provide film 7 with the desired number of colors. It will be understood that, preferably, a separate coloring film is employed to transfer each of the several colors to film 7 in succession, the latter being passed through the apparatus as many times as there are coloring films.

The manner of driving the several mechanisms of the apparatus will now be briefly described. The motor is indicated at 61 and main pulley 62 is driven thereby through the medium of belt 63. Pulley 62 is mounted on the driving shaft 62', on which shaft is also mounted worm pinion 64, which meshes with and drives worm 65 mounted on shaft 65'. Shaft 65' carries worm pinion 66, which meshes with worm 67 mounted on shaft 67', which carries the impression or form cylinder 49, heretofore described. Mounted on shaft 62' is worm gear 68 which meshes with worm 69 mounted on driving shaft 70, which shaft carries on its other end worm 71 which, in turn meshes with worm 72 mounted on shaft 21, whereby color take-up roller 19 is driven. Roll 20 is driven from shaft 21 through the intervention of driving gear 75, intermediate gears 77 and gear 76 mounted on shaft 26.

Mounted on shaft 70 is a worm gear 73, which through the medium of worm 74, drives pressure roller 32, which roller, in turn drives roller 31.

It will be understood that formal changes may be made in the mechanisms described, such as changes in location, substitution of equivalents, etc., without departing from the spirit of the invention, the scope of which is commensurate with the appended claims, and that parts of the apparatus may be employed without employing the whole, or used in other relations or environments. Moreover, the manner of coloring the film, aside from any specific mechanism employed, is novel and constitutes a new process forming part of my invention.

Having thus fully described the invention, what I claim as new, and desire to secure by Letters Patent is:

1. In a machine for coloring motion picture films, a support for the film to be colored, a support for the coloring film, a liquid color supply means, a roll for taking up liquid color, a second roll for receiving the color therefrom and applying it to certain parts of the coloring film, mechanical means for removing surplus color from the printing film, and means for transferring the color from the parts thus colored to corresponding portions of the film to be colored.

2. In a machine for coloring motion picture films, a support for the film to be colored, a support for the coloring film, means for applying color to the latter, means for removing color from certain parts of the latter, a mechanical device for cleaning said color removing means, and means for transferring color from the remaining parts of said film to the film to be colored.

3. In a machine for coloring motion picture films, a supply roller for the film to be colored, a supply roller for the coloring film, means for applying color to the coloring film, a form roller on which said films are brought into correct registration and engagement for printing, and a spring pressed roller coöperating with said form roller for adjusting the pressure between the films, whereby the color is transferred from the coloring film to the film to be colored and take-up means for each of said films.

4. In a machine for coloring motion picture films, a supply roller for the film to be colored, a supply roller for the coloring film, a liquid color take up roller, a second roller for receiving color from the take up roller and transferring it to the coloring film, means for varying the pressure of said latter roller on the coloring film, means for removing surplus color from the film, and means for bringing the two films into printing engagement.

5. In a machine for coloring motion picture films, a supply roller for the film to be colored, a supply roller for the coloring film, means for applying color to the coloring film, color supplying apparatus, mechanical means for removing color from certain parts of said film, mechanical means for cleaning said color removing means, and means for transferring color from other parts of said film to corresponding parts of the film to be colored.

6. In a machine for coloring motion picture films, means for feeding the film to be colored, a color applying film, means for applying liquid color to the coloring film embodying a color supply, a roller rotatable therein for taking up color, a color receiving roll coöperating therewith for applying color directly to the film, means for regulating the pressure of the color receiving roller on the film, means for removing surplus color from the film and means for causing the coloring film to facially engage the film to be colored, whereby color is transferred from the coloring film to the film to be colored.

7. In a machine for coloring motion picture films, a feed roll for supporting the film to be colored, a feed roller for supporting the coloring film, means for applying color to the latter, mechanical means for removing color from certain portions of the surface of said film, means for receiving and collecting the color thus removed, means for causing the films to move in registration with each other and means for causing facial engagement of the films, whereby color is transferred from the coloring film to the film to be colored.

8. In a machine for coloring motion picture films, a feed roll for supporting the film to be colored, a feed roller for supporting the coloring film, means for applying color to the latter, means operable simultaneously on both faces of the film for removing surplus color therefrom, means for causing the films to move in registration with each other, including means for automatically and yieldably tensioning both of said films, means for causing facial engagement of the films, and means for automatically regulating the pressure of such engagement and automatically compensating for varying thickness of films, whereby color is transferred from the coloring film to the film to be colored in perfect uniformity.

9. In a machine for coloring motion picture films, a feed roll for supporting the film to be colored, a feed roller for supporting the coloring film, a color tank, a roller for taking up color therefrom, means for adjusting said roller to regulate the amount of color taken up thereby, a second roller for receiving color from said color take up roller and applying it to the printing film, means for causing the films to move in registration with each other, means for causing facial engagement of the films, whereby color is transferred from the coloring film to the film to be colored, and take-up rolls for each of said films after the coloring operation has been effected.

10. In a machine for coloring motion picture films, means for supporting the film to be colored, means for supporting the coloring film, a color tank, rolls coöperating therewith for applying color to the coloring film, a support and pressure roller for removing surplus color from said coloring film, means for cleaning said pressure roller, a form roller and a pressure roller coöperating therewith for causing facial engagement of the films on said form roller, whereby color is transferred from the coloring film to the film to be colored.

11. In a machine for coloring motion picture films, means for supporting the film to be colored, means for supporting the coloring film, a color tank, rolls coöperating therewith for applying color to the coloring film, means for regulating the amount of color applied to said rolls, means for regulating the pressure at which the color is applied to the coloring film, a roller support and pressure roller for removing surplus color from said coloring film, means for cleaning said rollers, means for causing facial engagement of the films, whereby color is transferred from the coloring film to the film to be colored, and means for varying the pressure at which the films engage.

12. In a machine for coloring motion picture films, means for supporting the film to be colored, means for supporting the coloring film, a color tank, rolls coöperating therewith for applying color to the coloring film, a support and pressure roller for removing surplus color from said coloring film, means for mechanically cleaning the pressure roller, means for causing facial engagement of the films, whereby color is transferred from the coloring film to the film to be colored, adjustable spring tension, means for varying the pressure at which the films engage, and take-up means for each of said films.

13. The method of coloring motion picture films which consists in applying color to certain parts of one face only of a color printing film in a dry state and leaving the side margins of the film free from color, then thoroughly cleaning the parts of the film which it is not desired to print, then bringing said film into engagement with the film to be colored, with the colored parts of the printing film in registration with corresponding parts of the film to be printed, whereby the latter receives a given color at predetermined portions thereof.

14. The method of coloring motion picture films which consists in applying color to certain parts of one face only of a color printing film while in a dry state, then thoroughly cleaning the parts of the film which it is desired will not print, then bringing said film into engagement with the film to be colored, with the colored parts of the first film in registration with corresponding parts of the film to be printed, whereby the latter receives a given color at predetermined portions thereof, and then repeating the operation with a different color and on different portions of the films.

15. The method of coloring motion picture films which consists in treating certain portions of one face only of a color printing film so that said portions only will not retain color, applying a color to said other portions while leaving the side margins of the film free from color, then thoroughly cleaning the portion to which it was not intended to apply color and thereafter transferring the color from the printing film to corresponding parts of the film to be printed.

16. The method of coloring motion picture films which consists in applying color resist to certain parts of a printing film while leaving the side margins free from such resist, then applying liquid color to the remaining portions of the film, except on the side margins thereof, then thoroughly cleaning the resist treated portions, and thereafter transferring directly to the film to be colored the color on the non-resist treated portions of the printing film to the corresponding parts of the said film to be colored and within the color free side margins of the latter.

In testimony whereof I have signed my name to this specification.

GOTTLIEB TAUSSIG.